United States Patent [19]

Huang

[11] Patent Number: 5,615,808
[45] Date of Patent: Apr. 1, 1997

[54] TEAPOT

[76] Inventor: Frank T.-H. Huang, Suite 804, 8 Fl., No. 128, Sec. 3, Ming-Sheng E. Rd., Taipei, Taiwan

[21] Appl. No.: 651,985

[22] Filed: May 21, 1996

[51] Int. Cl.$^6$ .................................................... B67D 3/00
[52] U.S. Cl. .......................... 222/472; 222/484; 222/509; 222/518
[58] Field of Search ................................. 222/470, 472, 222/484, 505, 509, 511, 518

[56] References Cited

U.S. PATENT DOCUMENTS

| | | | |
|---|---|---|---|
| 872,536 | 12/1907 | Nystrom | 222/472 |
| 1,092,101 | 3/1914 | Hansen | 222/518 X |
| 2,272,798 | 2/1942 | Hacmac | 222/472 X |
| 2,915,224 | 12/1959 | Beall, Jr. | 222/484 X |
| 4,648,535 | 3/1987 | Zimmermann | 222/472 |
| 4,676,411 | 6/1987 | Simasaki | 222/472 X |
| 4,687,122 | 8/1987 | Bothun et al. | 222/484 X |
| 4,844,290 | 7/1989 | McCurdy et al. | 222/484 X |
| 4,877,159 | 10/1989 | Strand | 222/484 |
| 5,037,015 | 8/1991 | Collins | 222/472 |

Primary Examiner—Kevin P. Shaver
Attorney, Agent, or Firm—Bacon & Thomas

[57] ABSTRACT

A teapot which includes a valve installed in the pot cover and retained by a spring to close the water passage and air passage of the pot cover, and a valve control switch mounted in the pot cover and driven to close/open valve, wherein the valve control switch includes a lever having a fixed end pivoted to the pot cover and a free end extending out of the pot cover for operation by hand, and a link having a fixed end pivoted to the pot cover, a middle part disposed in contact with the lever, and a free end supported on the valve stem of the valve and driven by the lever to move the valve to the open position and to simultaneously compress the spring.

2 Claims, 4 Drawing Sheets

TEAPOT

BACKGROUND OF THE INVENTION

The present invention relates to teapots, and relates more particularly to such a teapot which has a valve retained by a spring to close the water passage, and a valve control switch controlled to close/open the valve.

FIG. 1 shows a teapot according to the prior art, which is comprised of a pot body, a pot cover covered on the pot body, a valve mounted in the pot cover to close the water passage, and a straight level having a fixed end pivoted to the pot cover, a free end extending out of the pot cover, and a middle part supported on the valve stem of the valve. When the free end of the lever is depressed, the valve stem is forced downwards, causing the valve to open the water passage. FIG. 2 shows a similar structure of teapot in which the level has a different shape and is pivoted to the pot cover at a different location. These teapots are not satisfactory in function. Because the valve is directly moved by the lever and the moving distance of the valve is about one half of the moving distance of the free end of the lever, the flowrate is limited. If to prolongs the length of the lever in order to extend the moving distance of its free end, the operation of the lever becomes difficult.

SUMMARY OF THE INVENTION

The present invention has been accomplished to provide a teapot which eliminates the aforesaid problem. According to the present invention, a valve control switch is mounted in the pot cover and driven to close/open valve. The valve control switch comprises a lever having a fixed end pivoted to the pot cover and a free end extending out of the pot cover for operation by hand, and a link having a fixed end pivoted to the pot cover, a curved middle part disposed in contact with the lever, and a free end supported on the valve stem of the valve and driven by the lever to move the valve to the open position.

DETAILED DESCRIPTION OF THE PREFERRED EMBODIMENT

Figure 1:
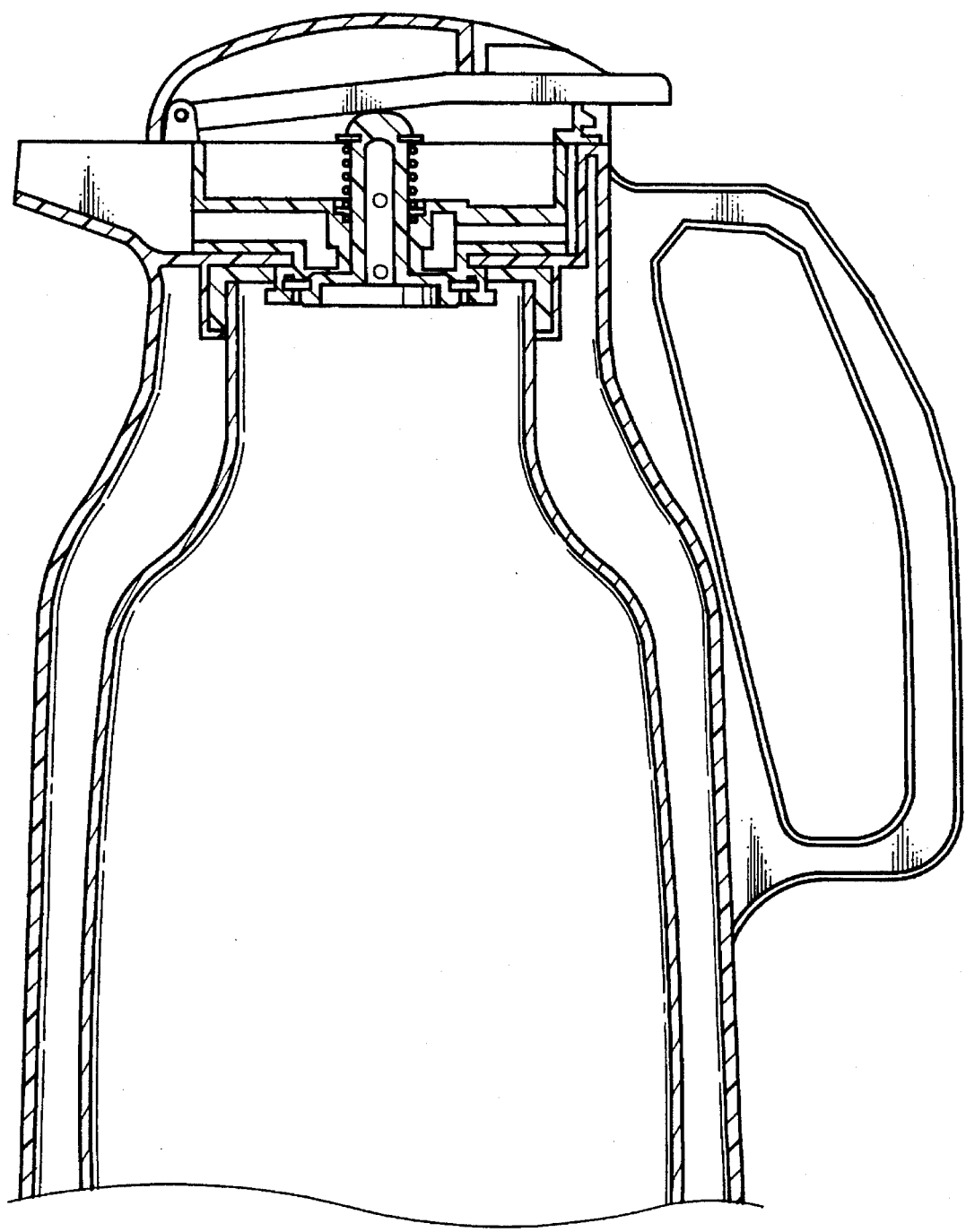
FIG. 1 is a sectional assembly view of a teapot according to the prior art.
Figure 2:
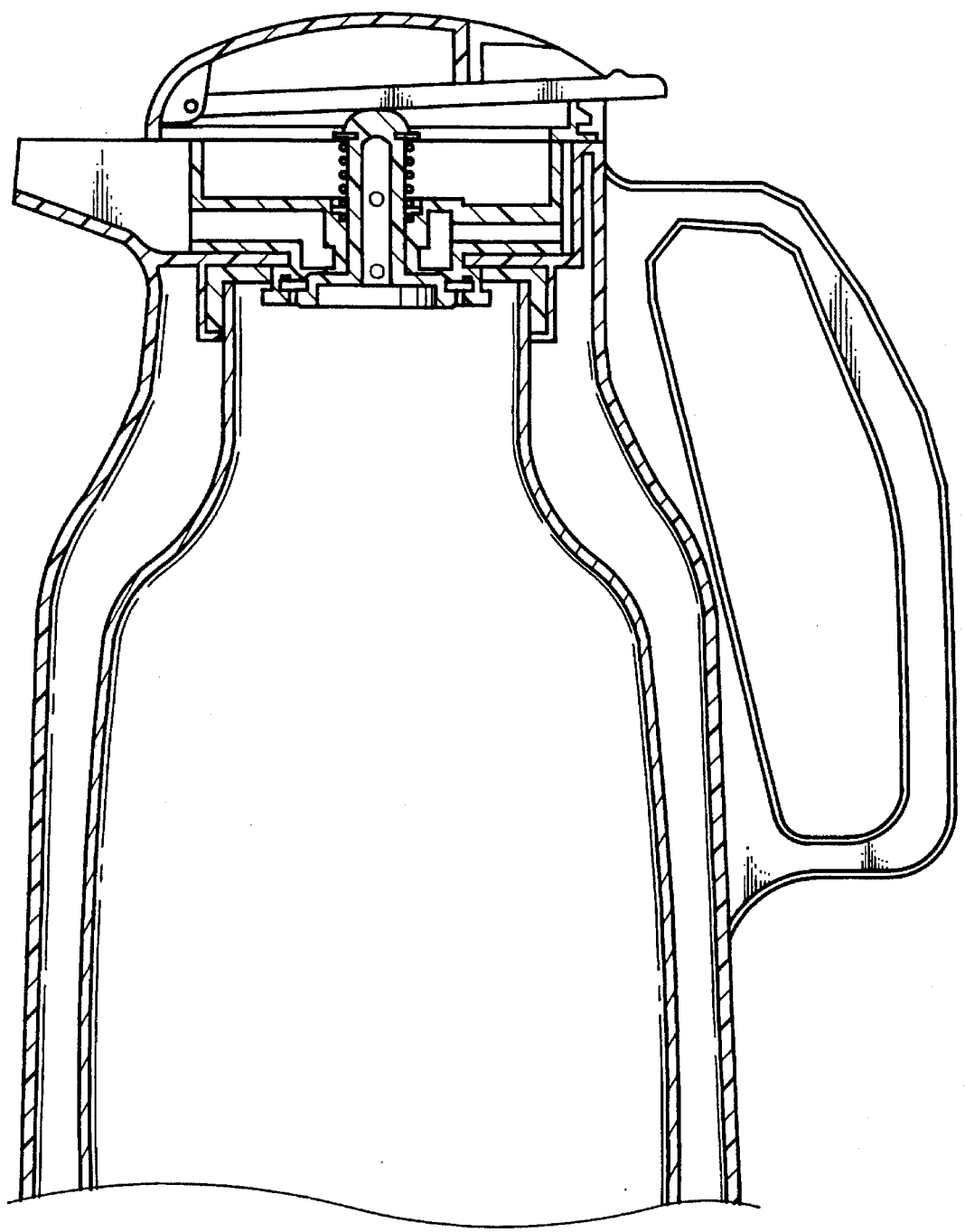
FIG. 2 is a sectional assembly view of another structure of teapot according to the prior art.
Figure 3:
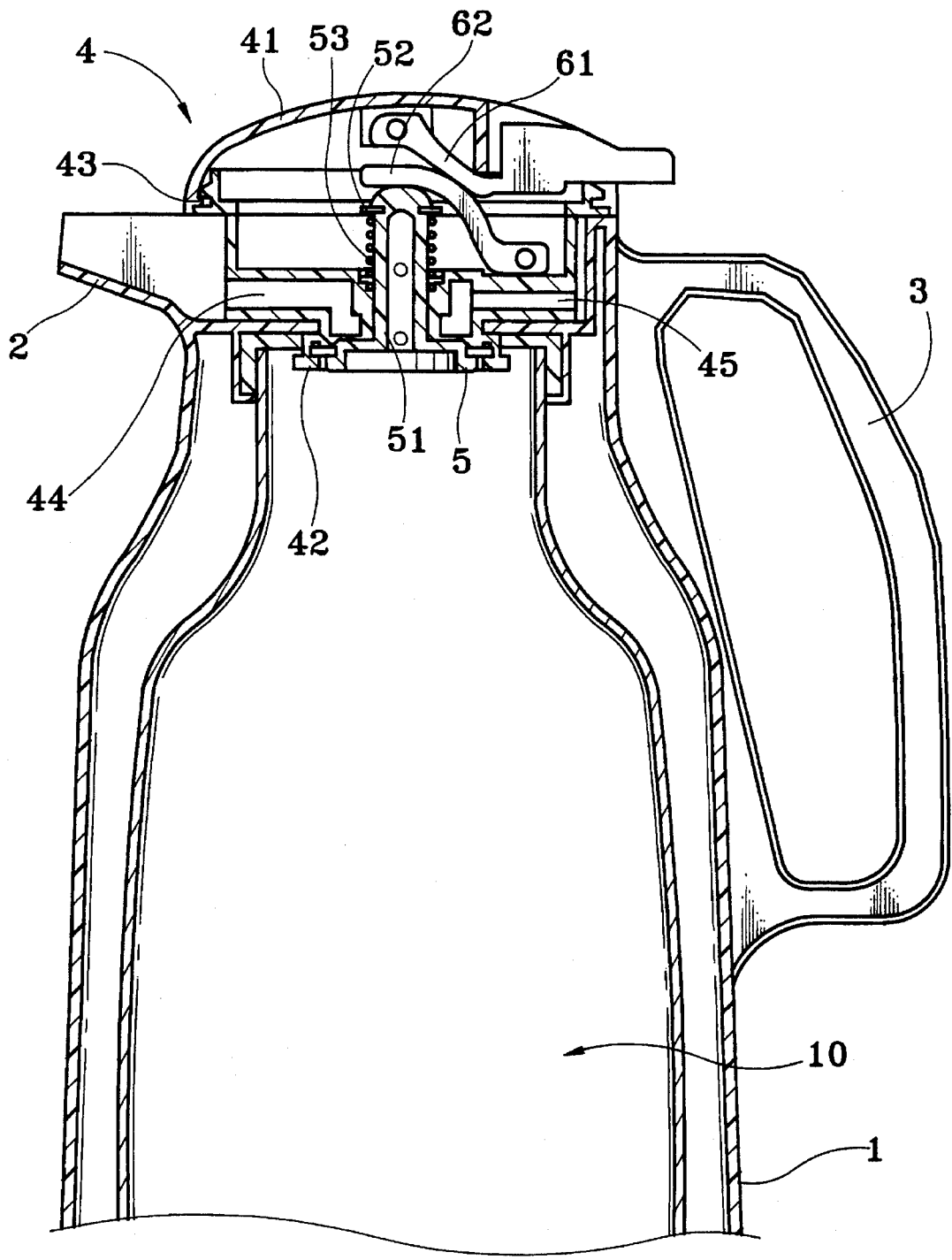
FIG. 3 is a sectional assembly view of a teapot according to the present invention.

Referring to FIG. 3, a teapot in accordance with the present invention is generally comprised of a pot body 1, a water chamber 10 defined within the pot body 1, a spout 2 at the periphery of the top open side of the pot body 1 through which water is poured from the pot body 1, a handle 3 fixedly secured to the pot body 1 on the outside opposite to the spout 2 for the holding of the hand to pour water from the pot body 1, and a pot cover 4 fastened to the pot body I by a screw joint to close its top open side. The pot cover 4 is comprised of a cover shell 41, and a valve seat 42 fastened to the cover shell 41 by hooks 43. The valve seat 42 defines a water passage 44 communicating between the water chamber 10 and the spout 2, and an air passage 45 communicating between the water chamber 10 and the atmosphere. A valve 5 is mounted in the valve seat 42 to normally close the water passage 44 and the air passage 45.

The valve 5 comprises an upright valve stem 51, a stem washer 52 mounted around the upright valve stem 51 near its top end, a spring 53 mounted around the valve stem 51 and stopped between the stem washer 52 and the valve seat 42 to force the valve 5 into the close position. A valve control switch is installed in the pot cover 4 to open/close the valve 5. The valve control switch is comprised of a lever 61 having one end pivoted to the inside wall of the cover shell 41 and an opposite end extending out of the pot cover 4 and suspending above the handle 3, and a link 62 pivoted to the valve seat 42 and reversed to the lever 61. The free end of the link 62 is supported on the top end of the valve stem 51. The middle part of the link 62 is disposed in contact with the lever 61. Therefore, when the lever 61 is turned, the link 62 is relatively moved.

Figure 4:
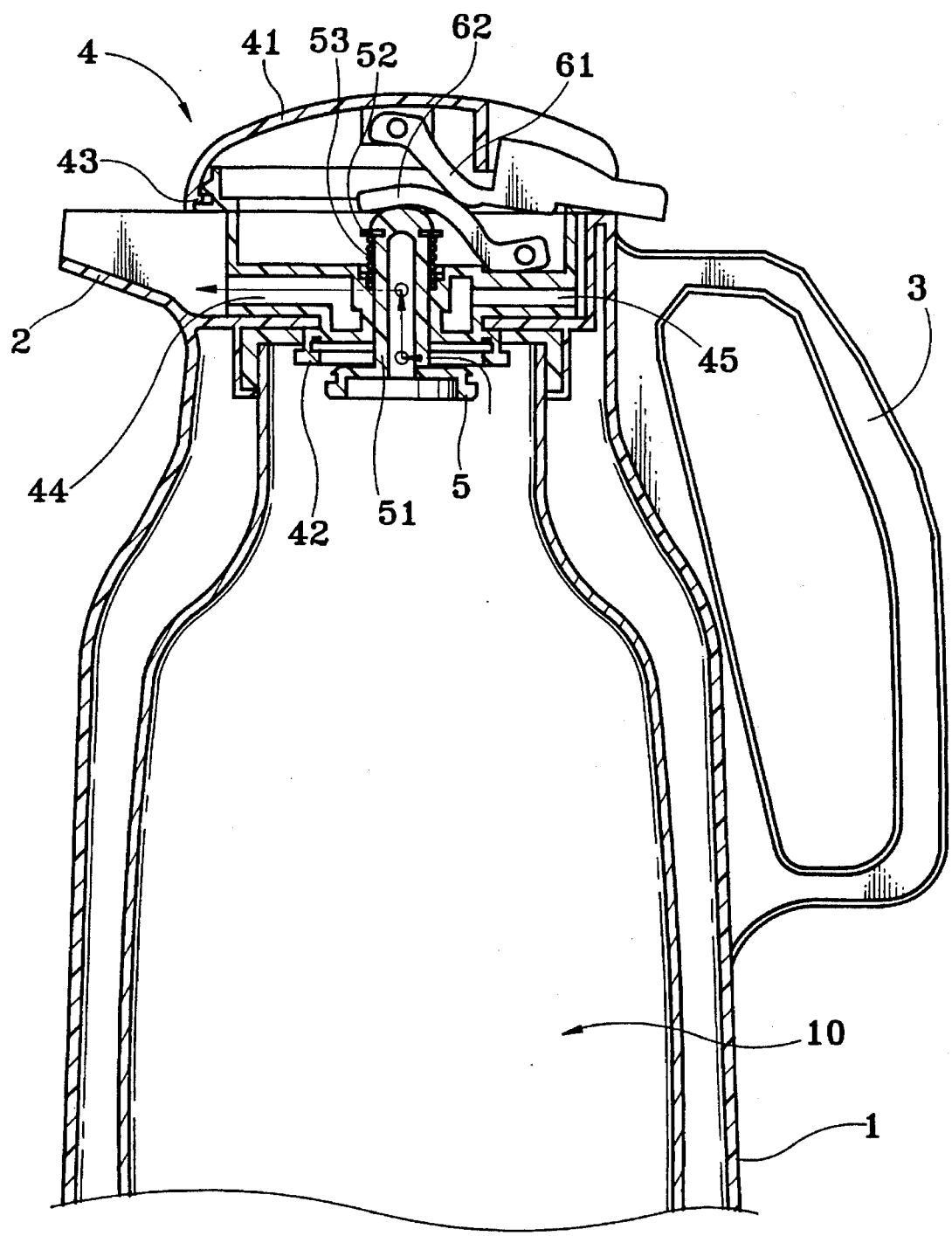
FIG. 4 shows the teapot of FIG. 3 operated.

Referring to FIG. 4, when in use, the hand holds the handle 3, the thumb can be depressed on the free end of the lever 61, causing it to force the link 62 downwards, and therefore the valve stem 51 is pushed downward to force the valve 5 open the water passage 44 and the air passage 45, for permitting water to be poured from the water chamber 10 out of the spout 2. When the valve stem 51 is moved downwards, the spring 53 is compressed. Therefore, when the lever 61 is released from the hand, the spring 53 immediately returns to its former shape, causing the valve 5 to be lifted to its former position to close the water passage 44 and the air passage 45. Because the middle part of the link 62 is disposed in contact with the middle part of the lever 61, the moving distance of the free end of the link 62 is longer than that of its middle part. Therefore the moving distance of the valve 5 is about equal to or longer than the moving distance of the lever 61. The moving distance of the valve 5 can be adjusted by changing the design of the contact point between the lever 61 and the link 62. The contact area between the lever 61 and the link 62 is preferably a curved surface so that the lever 61 and the link 62 can be constantly maintained in contact with each other.

While only one embodiment of the present invention has been shown and described, it will be understood that various modifications and changes could be made without departing from the spirit and scope of the invention disclosed.

I claim:

1. A valve control switch for a teapot of the type comprising a pot body defining a water chamber and having an opening through which water is poured out of said water chamber, a spout at the periphery of the opening of said pot body for guiding water out of said water chamber, a handle fixedly secured to said pot body on the outside opposite to said spout, a pot cover fastened to said pot body by a screw joint to close said opening, said pot cover defining a water passage in communication between said water chamber and said spout, and an air passage in communication between said water chamber and the atmosphere, a valve mounted in said pot cover and moved to close and open said water passage and said air passage, said valve having an upright valve stem axially coupled to said pot cover, and spring means coupled between said valve stem and said pot cover to hold said valve in the close position, the valve control switch comprising a lever having a fixed end pivoted to said pot cover and a free end extending out of said pot cover for operation by the user, and a link having a fixed end pivoted to said pot cover, a middle part disposed in contact with said lever, and a free end supported on said valve stem and driven by said lever to move said valve to the open position and to simultaneously compress said spring.

2. The valve control switch of claim 1 wherein the free end of said lever is suspended above said handle.

\* \* \* \* \*